United States Patent [19]

Wilke

[11] Patent Number: 4,570,672

[45] Date of Patent: Feb. 18, 1986

[54] HYDRAULIC CONTROL VALVE WITH INDEPENDENTLY OPERABLE BYPASS VALVE

[75] Inventor: Raud A. Wilke, Brookfield, Wis.

[73] Assignee: Koehring Company, Brookfield, Wis.

[21] Appl. No.: 720,086

[22] Filed: Apr. 5, 1985

Related U.S. Application Data

[63] Continuation-in-part of Ser. No. 503,910, Jun. 13, 1983, abandoned.

[51] Int. Cl.[4] ........................ F15B 11/08; F16K 11/10

[52] U.S. Cl. ................................ 137/596.13; 91/444; 91/448; 91/450; 137/596.14; 137/596.18

[58] Field of Search ...................... 137/596.12, 596.13, 137/596.14, 596.15, 596.18; 91/429, 444, 448, 450

[56] References Cited

U.S. PATENT DOCUMENTS

| | | | |
|---|---|---|---|
| 3,216,443 | 11/1965 | Schmiel | 137/596.13 |
| 3,464,443 | 6/1969 | Tennis | 137/596.18 |
| 3,771,424 | 11/1973 | Allen et al. | 91/448 |

FOREIGN PATENT DOCUMENTS

| | | | |
|---|---|---|---|
| 897547 | 4/1972 | Canada | 91/448 |

*Primary Examiner*—John J. Camby
*Attorney, Agent, or Firm*—Andrus, Sceales, Starke & Sawall

[57] ABSTRACT

A hydraulic sectional control valve includes separate pump pressure and function control spools. The spools may be actuated independently and sequentially to provide raising, holding and power down functions for earthmoving and construction vehicles. Additional function control spools may be added in the valve structure to provide multiple function control.

6 Claims, 4 Drawing Figures

FIG. 1
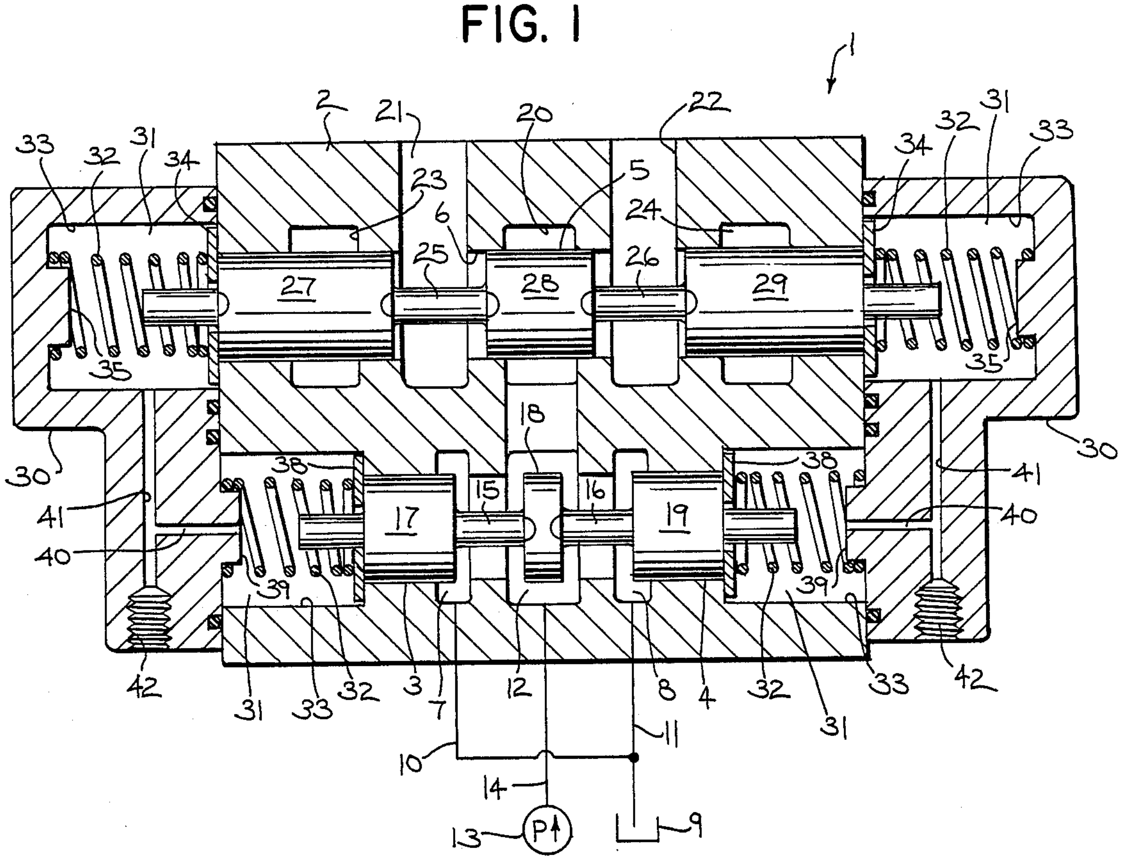
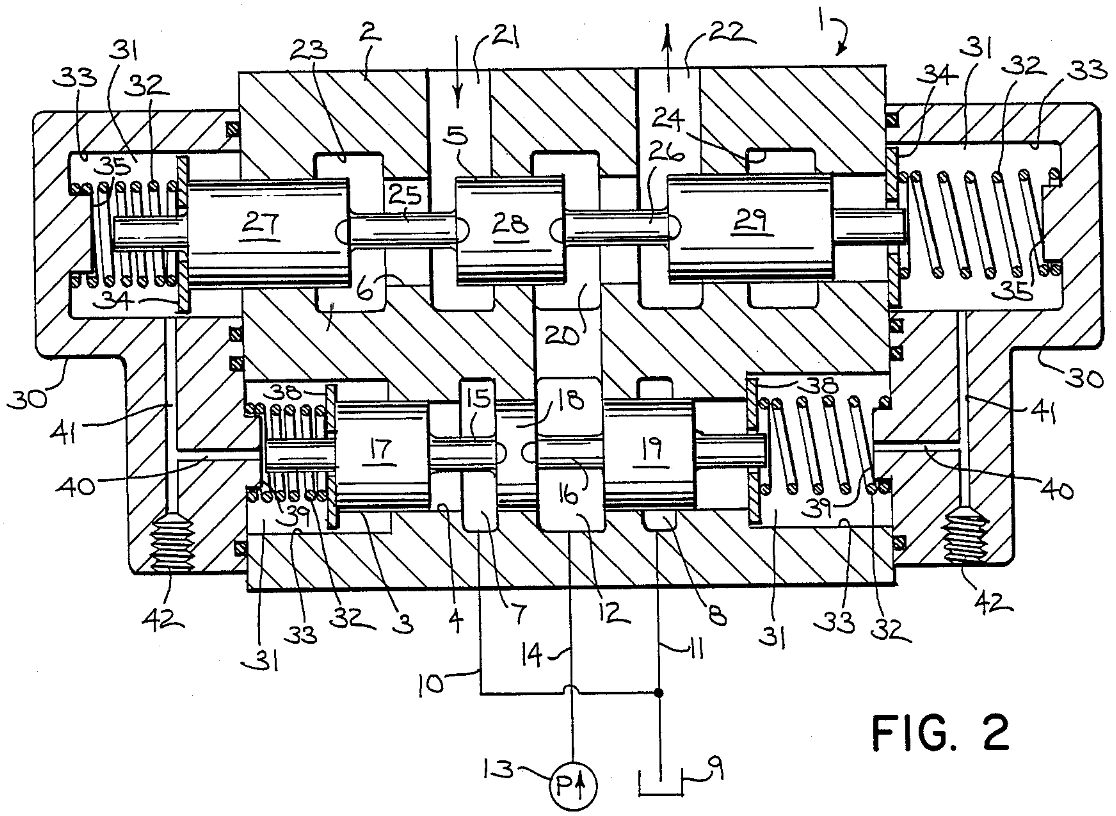
FIG. 2

HYDRAULIC CONTROL VALVE WITH INDEPENDENTLY OPERABLE BYPASS VALVE

BACKGROUND OF THE INVENTION

This is a continuation-in-part of application Ser. No. 06/503,910 filed June 13, 1983 and now abandoned.

The present invention relates to hydraulic control valves for earthmoving and construction equipment, and more particularly to a hydraulic control valve with independent pump and function control spools.

A typical control valve includes a single independently operable control spool slidably received therein within a bore for moving from a neutral position to each of a pair of operating positions. The control spool functions to control both the pump flow as well as the directional flow of hydraulic fluid to and from a hydraulic actuator or load.

Various types of hydraulic control valves are known and commonly used in earthmoving and construction vehicles. See for example U.S. Pat. Nos. 3,729,026 and 3,881,512, both of which are assigned to the assignee of the present application, as well as U.S. Pat. Nos. 4,154,262 and 3,209,781. In these types of control valves, a spool connects either of a pair of service or work ports with a bridge-like feeder passage and the other work port with one of a pair of exhaust ports. The spools are generally three position spools which are designed to block the work ports in their neutral positions. In one operating position, the spool directs oil from the pump to one port and oil from the other work port returns to tank. In the other operating position, the oil flow is reversed.

In order to accomplish the fine regulation of flow and pressure required, control spools include a plurality of axially spaced circumferential grooves that define a series of lands. The position of the grooves and lands within the bore thus controls the flow of hydraulic fluid. As a result, the spool-to-bore fit is very critical in order to minimize leakage. Thus, the spools are honed to a select fit within the bore with the maximum spool-to-bore lap possible. However, in more complex spool designs it becomes difficult to maintain a sufficient spool-to-bore lap and thus fluid leakage becomes more difficult to control. In addition, the more complex the spool the more difficult it becomes to modify the valve function.

SUMMARY OF THE INVENTION

A hydraulic control valve includes separate pump pressure and function control spools. The spools may be actuated independently and sequentially to provide raising, holding and power down functions for earthmoving and construction equipment.

In one form, the valve includes a pump pressure control spool and a function control spool. The two spools separate the functions normally performed by a single spool in conventional control valves so that the function control spool directs the flow of fluid to and from a hydraulic actuator and the pump pressure control spool controls pump flow. This provides for precise regulation of the flow and pressure of hydraulic fluid in the circuit.

The positions of the pump pressure and function control spools can be controlled by pilot operated spring centering mechanisms. By changing the spring forces and varying the relationship between the spring forces on the two spools, their relative movements can be changed depending on the desired function, circuitry or type of control desired. For example, the spring force acting on the pump pressure control spool can be less than that acting on the function control spool so that the pump pressure control spool can be moved to its stroked position first, pump pressure can be elevated to a "precharge" level prior to moving the function control spool to an operating position. This "precharge" pump pressure eliminates voids by providing sufficient pressure in the circuit when the function control spool is operated. In contrast, if the function control spool is moved to an operating position first while maintaining the pump pressure control spool in its neutral position, undesirable flow from a work port to tank can be initiated first.

The provision of a pair of spools instead of a single spool also eliminates the bridge-like feeder passage which communicates near the opposite ends of a conventional function control spool. This provides a valve housing which is easier and less expensive to manufacture. Separate pump pressure and function control spools also provide maximum spool-to-bore lap for minimum fluid leakage since the complex design of a single function control spool may be divided into two spools.

Additional function control spools may also be added to the valve structure to provide multiple function control. When more than one function control spool is utilized, the valve functions like a standard parallel valve with the individual spools connected to the input or feed line of the control valve by a common passage so that the spool with the lowest pressure requirement will become operational first. Thus, when a plurality of function control spools are utilized in the present valve, the valve functions can be modified by merely changing the operational sequencing of the spools and not the spool design itself.

DESCRIPTION OF THE DRAWINGS

The drawings illustrate the best mode presently contemplated of carrying out the invention.

In the drawings:

FIG. 1 is a schematic sectional view of a hydraulic control valve embodying the principles of the present invention;

FIG. 2 is a schematic sectional view similar to FIG. 1 showing the spools thereof in one of their operating positions;

DESCRIPTION OF THE PREFERRED EMBODIMENTS

Figure 3:
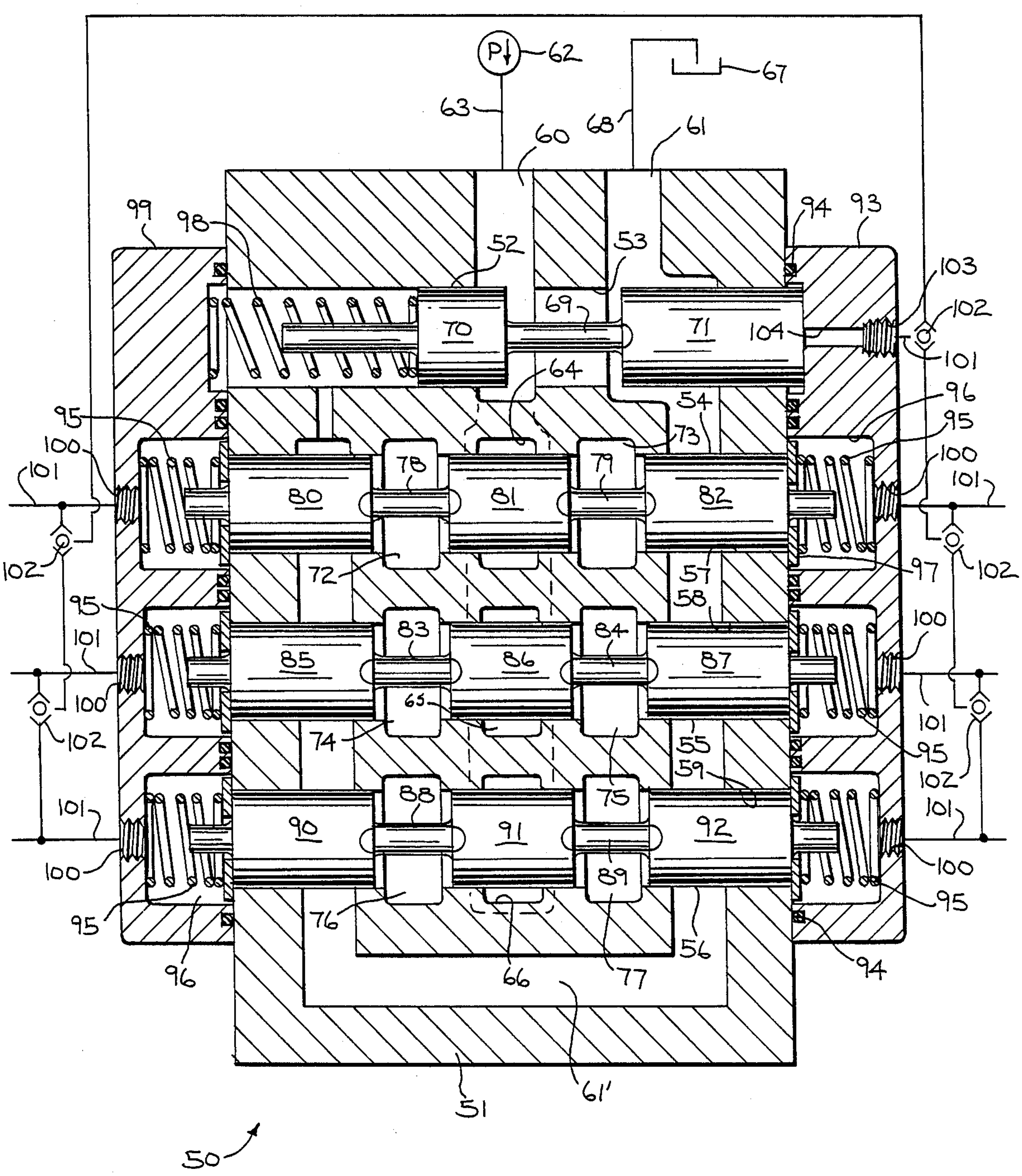
FIG. 3 is a schematic sectional view illustrating a modified form of the hydraulic control valve of the present invention.

Referring now to the drawings, FIG. 1 illustrates a hydraulic control valve, generally designated by the numeral 1, constituting a first embodiment of the present invention. Control valve 1 is of the closed center type and includes a housing or casing 2 shown in cross sectional detail in FIG. 1. Housing 2 has a pump pressure control spool 3 slidable within a bore 4 and a function control spool 5 slidable within a bore 6. Bore 4 includes three spaced apart annular grooves comprising a pair of bypass ports 7 and 8 connected to a reservoir 9 through return conduits 10 and 11, respectively, and an inlet port 12 located between bypass ports 7 and 8 and connected to a pump 13 through feed line 14. The ports 7, 8 and 12 are in fluid communication with each other through bore 4.

The pump pressure control spool 3 has a pair of circumferential grooves 15 and 16 cut therein in axially spaced locations. The grooves 15 and 16 define three lands 17–19. Lands 11 ∝ 19 and bore 4 are machined to close tolerances, as is conventional, to minimize fluid leakage. Land 18 is dimensioned to have an axial length which is less than the axial length of lands 17 and 19, and which substantially corresponds to the actual distance between inlet port 12 and bypass ports 7 and 8.

Bore 6 includes a plurality of spaced apart annular grooves formed in housing 2 at axially spaced locations. Inlet chamber 20 is centrally located with respect to bore 6 and is in fluid communication with inlet port 12 of bore 4. Chamber 20 and port 12 can thus be more generally termed as a fluid supply or feed passage which is dead ended at the chamber 20. A pair of service or work ports 21 and 22 are disposed on either side of inlet chamber 20. Work ports 21 and 22 are in fluid communication with inlet chamber 20 via bore 6, and lead to opposite ends of a fluid actuator, namely, a hydraulic ram (not shown). It is understood that the connection of work ports 21 and 22 to the head and rod ends of a ram is not intended to be the sole application of control valve 1 but that valve 1 could readily be adapted to other similar applications.

A pair of exhaust or return passages 23 and 24 join with bore 6 at positions axially outwardly of the work ports 21 and 22, respectively. Passages 23 and 24 are connected in the conventional manner to reservoir or tank 9.

Function control spool 5 is provided with a pair of axially spaced circumferential grooves 25 and 26 which define three spaced apart lands 27, 28 and 29 along the longitudinal axis of spool 5. As seen best in FIG. 1, lands 27 and 29 have identical axial lengths while middle land 28 is slightly shorter in axial length than lands 27 and 29. Lands 27–29 are located on spool 5 in positions which isolate the service or work ports 21 and 22 from the return passages 23 and 24 and from the feeder or inlet chamber 20 in the neutral or hold position of spool 5. This neutral or hold position for spool 5 is shown in FIG. 1.

Conventional spring centering mechanisms 31 are incorporated in caps 30 secured over the opposite ends of housing 2 to resist movement of each spool out of its neutral position. The centering mechanism includes springs 32 which are located within chambers 33 formed in the caps 30.

Figure 4:
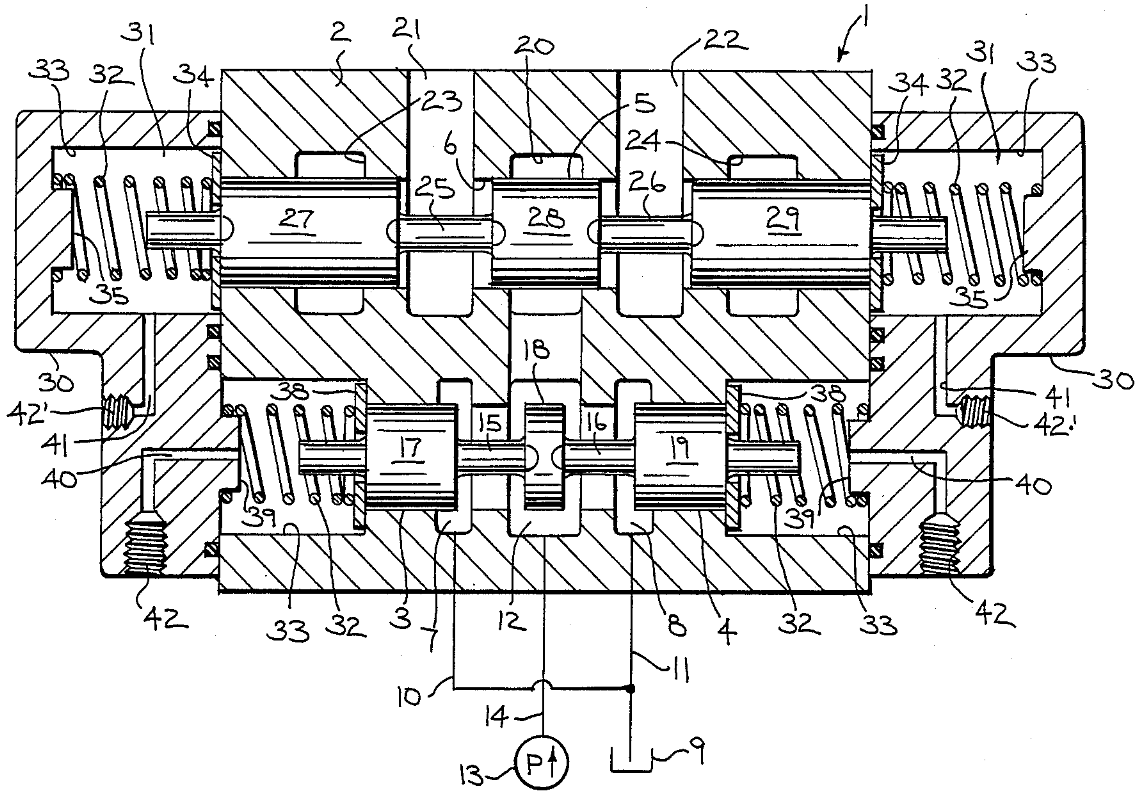
FIG. 4 is a schematic sectional view illustrating an alternate method of controlling the spools of the hydraulic control valve of the present invention.

Valve spools 3 and 5 are slidable in bores 4 and 6 by means of hydraulic pressure supplied to chambers 33. In order to supply the pressure, a pair of pilot passageways 40 and 41 which communicate at one end with chambers 33 and at their other ends with a threaded pilot port 42. FIG. 4 illustrates an alternate method of supplying pressure fluid to chambers 33. In this embodiment an additional pilot port 42' is provided which supplies pressure fluid to pilot passageway 41 while pilot port 42 supplies pressure fluid to pilot passageway 40. The utilization of separate pilot ports 42 and 42' is an alternate method of providing for independent operation of spools 3 and 5.

In operation, when the spools 3 and 5 are in their neutral positions, as shown in FIG. 1, hydraulic fluid flows from pump 13 to inlet port 12 through bore 4 to bypass ports 7 and 8 and back through conduits 10 and 11 to tank 9, thus rendering function control spool 5 inoperative. In this neutral position, the hydraulic actuator or ram remains hydraulically locked in a hold position and the pump is unloaded by the passages controlled by the spool 3.

Referring now to FIG. 2, the spools 3 and 5 are shown moved to the left out of their neutral positions and into one of their stroked positions. This is accomplished by delivery of pressure fluid to pilot ports 42 at the right hand end of the housing by means at a suitable pilot valve not shown. In this position, pump fluid is no longer bypassed to tank but is forced to flow to inlet chamber 20 in bore 6 containing function control spool 5 from whence the fluid flows to the governed motor via work port 22 while return fluid from the motor flows to the tank via work port 23.

If the positions of spools 3 and 5 in FIG. 2 define a load raising function for the hydraulic ram, it would be necessary to move spool 5 in the opposite direction, or to the right, in order to define a load lowering function for the hydraulic ram. This position for spools 3 and 5 is generally referred to as a "power down" position because pump pressure is being utilized in the circuit to lower the load.

It should be noted that if the spools 3 and 5 are in their neutral positions as shown in FIG. 1, and pump pressure spool 3 is moved or stroked first to the position shown in FIG. 2 prior to the movement of function spool 5, pump pressure can be elevated to a "precharge" level before moving spool 5. This allows pump 13 to keep sufficient pressure on the hydraulic ram to prevent voids. Since sufficient pressure is applied to the hydraulic ram air cannot be sucked into the system if the rod begins to move faster than fluid pressure would normally allow it. Thus, the independent action of spools 3 and 5 eliminates the time delay between movement of the spool and pressure buildup in the circuit which is normally present in single spool valves.

Such responses of the pump pressure control spool 3 prior to response of the function control spool 5 can be assured by having the spring force acting on spool 3 be slightly less than that acting on the spool 5. Thus, it will be seen that simultaneous delivery of pilot pressure fluid to pilot port 42 will achieve sequential response to the two spools 3 and 5. As discussed above this result can also be achieved by utilizing separate pilot ports 42 and 42' as shown in FIG. 4. Pilot ports 42 and 42' receive pilot pressure fluid from independent sources (not shown). These sources can sequence the two spools 3 and 5 independently. This alternate method of sequencing allows for the use of identical spring forces.

Referring now to FIG. 3 there is shown a closed center hydraulic control valve, generally designated by the numeral 50, constituting a second embodiment of the present invention. Control valve 50 includes a housing or casing 51 shown in cross sectional detail. Housing 51 has a pump pressure control spool 52 slidable within a bore 53 and three function control spools 54–56 slidable within corresponding bores 57–59.

Housing 51 includes an inlet port 60 and an outlet or exhaust port 61 which also serves as a bypass port. Inlet port 60 is centrally located in housing 51 and is connected to a pump 62 through feed line 63. Inlet port 60 is located at the upstream end of a fluid supply or feed passage and opens directly into bore 53 and communicates with each of the other bores 57–59 by means of three centrally located inlet chambers defined by annular grooves 64–66 formed respectively in bores 57–59. This feed passage is dead ended at the groove 66. As shown, outlet port 61 opens to a substantially U-shaped exhaust passage and is connected to a reservoir or tank 67 through return line 68. Exhaust passage 61' communicates with each of the bores 53 and 57–59 at axially opposite ends thereof.

The pump pressure control spool 52 has a single circumferential groove 69 cut therein which provides part of the bypass passage controlled by spool 52. This spool defines a pair of lands 70–71 at axially spaced locations. As shown, land 70 is dimensioned to have an axial length which is slightly less than the axial length of land 71.

A pair of service or work ports 72 and 73 are disposed on either side of inlet groove 64 of bore 57 between the groove 64 and the legs of the U-shaped exhaust passage 61'. Work ports 72 and 73 are selectively communicable with inlet groove 64 via bore 57 under the control of spool 54, and lead to opposite ends of a fluid motor (not shown).

As shown, bores 58 and 59 also include a pair of work or service ports 74–75 and 76–77, respectively. Work ports 74–75 and 76–77 function in the identical manner as ports 72–73 under the control of their associated spools except they lead to separate hydraulic motors.

Function control spools 55 and 56 are identical in dimensions to spool 54 and are similarly in their neutral or hold positions.

A conventional spring centering mechanism including a spring 95 located within a chamber 96 formed in each end cap is connected with the opposite ends of each spool 54–56 to yieldingly resist movement thereof out of its neutral position.

The spring mechanism for pump spool 52 biases spool 52 to the right, to a defined neutral position defined by its engagement with cap 93 as shown in FIG. 3, and includes a spring 98 located substantially within bore 53. One end of spring 98 acts on the left hand end of spool 52 and bears against land 70 while the other end of spring 98 bears against cap 99 which covers the left hand side of housing 51. Thus, when spool 52 is moved to the left of its position seen in FIG. 3 to a bypass closing position, spring 98 is compressed to yieldingly resist this movement.

Valve spools 52 and 54–56 are pilot actuatable in bores 53 and 57–59. In order to supply pilot pressure, the caps 93 and 99 include threaded pilot ports 100 which communicate at one end with chambers 96, and at their other ends with pilot lines 101 which are connected through a series of check valves 102 with a source of pilot pressure (not shown). Pump pressure spool 52 is actuated to the left by pilot pressure supplied through a threaded pilot port 103 which communicates at one end with a passageway 104 and at its other end with a pilot line 101. Passageway 104 in turn leads to the face of land 71 of spool 52 so that when pressure is applied thereagainst spool 52 moves to the left against the force of spring 98.

In operation, when the spools 52 and 54–56 are in their neutral positions, as shown in FIG. 3, hydraulic fluid flows from pump 62 to inlet port 60 through bore 53 and is bypassed to exhaust port 61 back through return line 68 to tank 67. Thus, pump fluid bypasses all of the function control spools and the feed passage provided by grooves 54–56 is vented to tank.

In order to raise or lower a load, pump pressure or bypass control spool 52 needs to be moved to its operational position, and one of the spools 54–56 need to be moved out of its neutral positions and into one of its stroked positions. The following discussion relates only to the operation of spools 52 and 54. However, it is to be understood that spools 55 and 56 operate in an identical manner to spool 54 to control separate hydraulic actuators. Therefore, if spools 52 and 54 are moved to the left, land 71 of spool 52 blocks bypass of pump fluid from inlet port 60 and exhaust port 61 so that full pump pressure is applied to inlet groove 64. Hence, pump fluid can then flow to one side of the governed motor via work port 73 while the exhaust fluid from the other side of the motor is returned to tank via port 72 then in communication with the exhaust passage 61'.

If the positions of spools 52 and 54 when moved to the left define a load raising function for the hydraulic motor, it would be necessary to move spool 54 in the opposite direction, or to the right, in order to define a load lowering or power down function for the motor.

If spools 52 and 54 are in their neutral positions as shown in FIG. 3, and pump spool 52 is moved or stroked first to the left to its operations position prior to the movement of function spool 54, pump pressure can be elevated to a "precharge" level before moving spool 54. This is again accomplished by having spring 98 exert less force on spool 52 that springs 95 exert on spool 54. This sequential operation may also be performed with respect to spools 55 and 56. Thus, the independent action of spools 52 and 54–56 eliminates the time delay between movement of a function spool and pressure buildup in the circuit which is normally present in single spool valves under the action of a common pilot valve. As described above FIG. 4. shows a modification of the valve of this invention wherein the pump pressure and function control valves are operated independently by separate pilot valves (not shown). This method of sequencing can be utilized in the hydraulic control valve 50 of FIG. 3 by providing pilot pressure fluid to ports 100 and 103 from independent sources.

A hydraulic control valve has been illustrated and described herein that includes sequentially operated pump pressure and function control spools. Various modifications and/or substitutions may be made to components specifically described herein without departing from the scope of the invention. For example, the design of the valve housing and spools may be modified to suit the circuitry and type of control desired. Various types of spool actuating mechanisms may also be used.

Various modes for carrying out the invention are contemplated as being within the scope of the following claims particularly pointing out and distinctly claiming the subject matter which is regarded as the invention.

I claim:

1. Hydraulic control valve means of the type having an inlet to receive pressure fluid from a source, source fluid receiving means in communication with the inlet, and a function control valve element movable to and from an operative position at which it establishes communication between said fluid receiving means and a work port, characterized by:

means providing a bypass passageway connected with said inlet and through which pressure fluid from the source can bypass said fluid receiving means to thereby prevent pressurization thereof, a bypass control valve element intersecting said passageway and which must be moved from a bypass open position, at which it causes source fluid to bypass said receiving means, to an operative bypass closing position before source fluid can flow to said fluid receiving means to effect pressurization thereof, and first biasing means acting on said bypass control valve element to normally yieldingly hold the same in its bypass open position at which the function control valve element is ineffective.

2. The hydraulic control valve means of claim 1 further characterized by:

means for effecting successive actuation of said valve elements to their operative positions, including means for assuring movement of the bypass control valve element toward its bypass closing position in advance of movement of the function control valve element to its operative position.

3. The hydraulic control valve means of claim 1 further characterized by:

means for effecting independent actuation of said valve element to their operative positions.

4. The hydraulic control valve means of claim 1 further characterized by:

second biasing means acting on said function control valve element to normally yieldingly hold the same in its inoperative position, said valve elements being moved to their operative positions by means of a common pressurized pilot fluid acting on both of said valve elements with said pilot fluid overcoming said first biasing means prior to overcoming said second biasing means so that said bypass control valve moves to its operative or closed position prior to said function control valve moving to its operative position.

5. The hydraulic control valve means of claim 1 further characterized by:

second biasing means acting on said function control valve element to normally yieldingly hold the same in its inoperative position, said valve elements being moved to their operative positions by means of a common pressurized pilot fluid acting on both of said valve elements, and means for independently providing actuating pilot fluid to each of said valve elements.

6. The hydraulic control valve means of claim 1 further characterized by:

said bypass control valve element comprising an axially slidable spool having circumferential groove means therein to provide part of said bypass passageway, and said groove means defining lands having opposing faces of equal area that provide the sole spool surfaces that are exposed to pressure fluid from the source in said bypass open position of the spool.

* * * * *